United States Patent [19]

Dembinski et al.

[11] 4,333,627

[45] Jun. 8, 1982

[54] ARRANGEMENT FOR MOVING AN OBJECT

[75] Inventors: Walter Dembinski, Schweinfurt; Karl-Joachim Kühne, Niederwerrn, both of Fed. Rep. of Germany

[73] Assignee: Fichtel & Sachs AG, Schweinfurt, Fed. Rep. of Germany

[21] Appl. No.: 112,717

[22] Filed: Jan. 14, 1980

[30] Foreign Application Priority Data

Feb. 1, 1979 [DE] Fed. Rep. of Germany ....... 2903782

[51] Int. Cl.³ ...................... A45D 19/04; A47J 47/16; F16M 16/00
[52] U.S. Cl. ...................................... 248/396; 248/393
[58] Field of Search ................ 297/248; 248/393, 394, 248/397, 396

[56] References Cited

U.S. PATENT DOCUMENTS

| | | | |
|---|---|---|---|
| 2,837,931 | 6/1958 | Brundage | 248/393 X |
| 2,839,124 | 7/1958 | Desmond et al. | 248/393 |
| 2,939,513 | 6/1960 | Leslie et al. | 248/394 |
| 3,105,577 | 10/1963 | Iding | 248/394 |
| 3,365,163 | 1/1968 | Pickles | 248/394 |
| 4,015,812 | 4/1977 | Heesch | 248/394 |

FOREIGN PATENT DOCUMENTS 1680608  11/1969  Fed. Rep. of Germany ...... 248/393

*Primary Examiner*—Wayne L. Shedd
*Attorney, Agent, or Firm*—Toren, McGeady & Stanger

[57] ABSTRACT

An arrangement for imparting different adjustable directional movements to an object includes a number of adjusting gear assemblies each corresponding to one of different adjustable directional movements. Each adjusting gear assembly includes a gear housing, a worm and a worm gear both supported in the housing in meshed engagement with each other. The arrangement also includes a first motion transmitting mechanism for driving the worm and a second motion transmitting mechanism for connecting the worm gear to the object to adjustably move the object when the worm gear is driven by the worm. The gear housings of the adjusting gear assemblies are constructed substantially identical.

29 Claims, 12 Drawing Figures

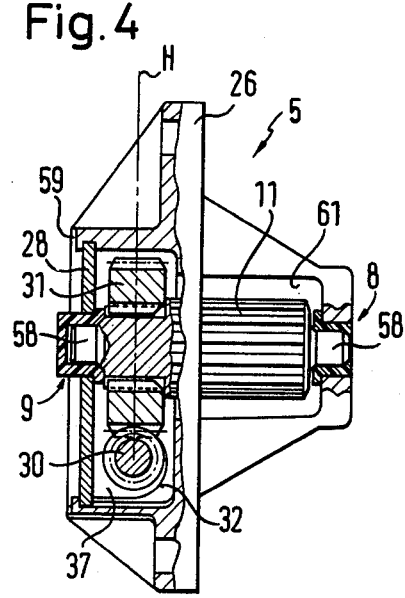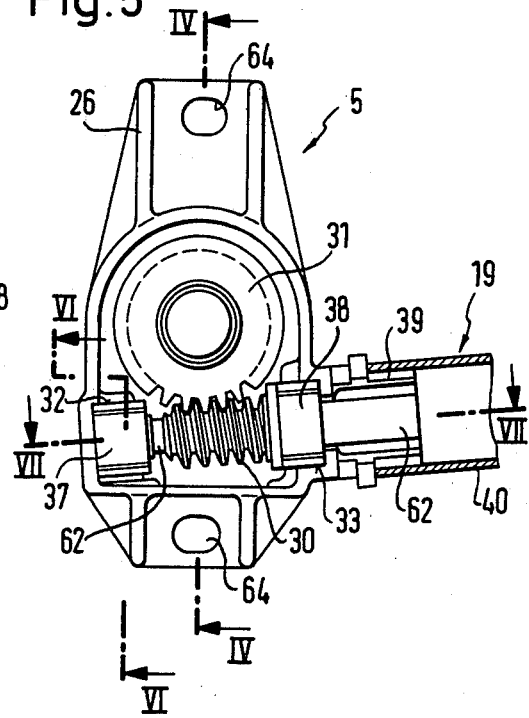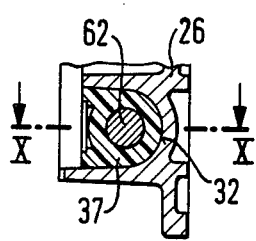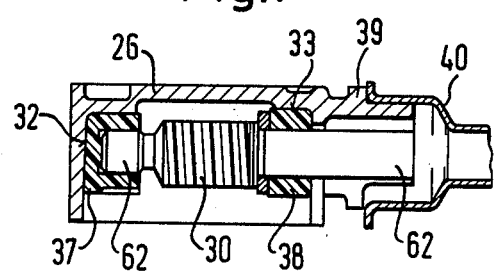

ARRANGEMENT FOR MOVING AN OBJECT

BACKGROUND OF THE INVENTION

The present invention relates to an arrangement for imparting various kinds of movement to an object, for example, a motor vehicle seat, wherein for each desired movement at least one worm gear adjusting assembly is provided having its worm connected to a driving mechanism through a motion transmitting member and having its worm gear connected to the object to be moved through another motion transmitting member.

Arrangements similar to that of the present invention are known, for example, from U.S. Pat. Nos. 3,105,557 and 3,365,163 and German Offenlegungsschrift No. 16 80 608.

In the known prior arrangements, the varied surrounding conditions for the individual adjusting gear assemblies have necessitated that the adjusting gear assemblies be designed differently from one another. Thus, a relatively large number of different components, including expensive gear housings, are required for these assemblies.

An object of the present invention is to provide an arrangement for imparting movement to an object wherein fewer individual components are required.

In accordance with the present invention, the above and other objects are achieved by providing an arrangement for imparting movement to an object including a number of adjusting gear assemblies, each of the gear assemblies operating to impart a particular type of directional movement to the object, wherein the adjusting gear assemblies have gear housings of substantially identical structure.

It is preferred that each of the adjusting gear assemblies is self-locking in the sense that movement cannot be transferred from the worm gear to the worm, so that corresponding movement of the object does not occur as a result of the object's own weight or a load applied to the object.

It is also preferred that different drive mechanisms be used for different desired types of movement, thereby increasing the freedom to mount the present arrangement at various locations.

Further cost reductions can be realized when the worms and the worm gears of all the adjusting gear assemblies are each substantially identical.

It is especially desirable that all the adjusting gear assemblies within the present arrangement are entirely identical.

It is possible to drive two or more output adjusting members from one adjusting gear assembly, so that for a given number of desired types of object movement, the total number of adjusting gear assemblies required can be reduced by connecting the output members from a given adjusting gear assembly to act at different locations of the object to be moved.

A particularly important feature of the present invention resides in the fact that the worm can be supported in various angular positions relative to the adjusting gear assembly housing through which it extends. This is accomplished by providing bearing inserts of different shapes for supporting the worm shaft, and arranging a connecting point for a protective jacket of a flexible transmission element at the bearing insert.

The various features of novelty which characterize the invention are pointed out with particularity in the claim annexed to and forming a part of this disclosure.

For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 4 is a partial sectional view through an adjusting gear assembly taken along line IV—IV of FIG. 5;

FIG. 5 is a view, partly in section, of the adjusting gear assembly of FIG. 4 with its cover removed;

FIG. 6 is a sectional view taken along the line VI—VI of FIG. 5;

FIG. 7 is a sectional view taken along line VII—VII in FIG. 5;

DETAILED DESCRIPTION OF THE INVENTION

Figure 1:
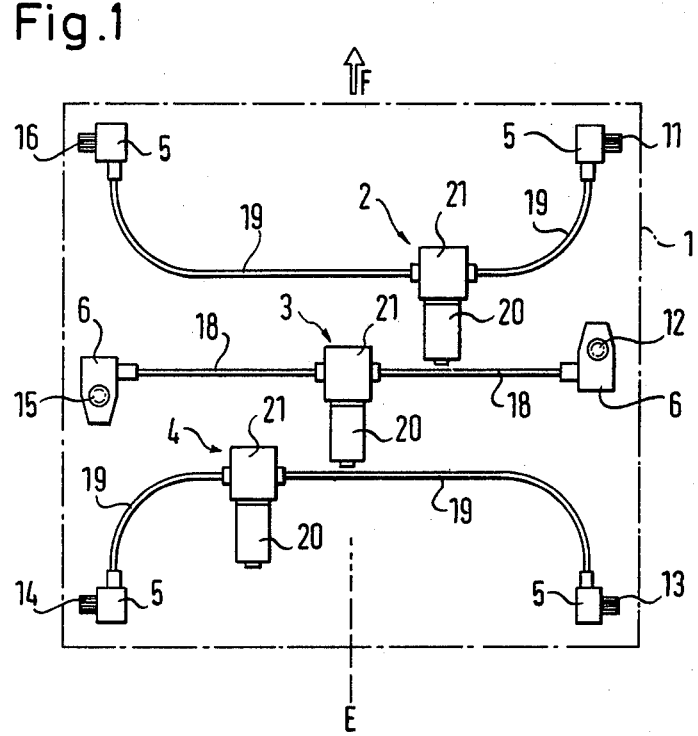
FIG. 1 is a schematic diagram showing three drive units, each unit driving two adjusting gear assemblies according to the present invention.

FIG. 1 is a schematic diagram of a seat adjusting arrangement wherein the direction of travel of a motor vehicle equipped with an adjustable seat is indicated by F, and wherein adjusting pinions 11 to 16 are arranged for adjustable seat movement on both sides of the longitudinal median plane E of the seat region 1.

Adjusting pinions 11 and 16 operate to adjust the front portion of the seat in the vertical direction. Adjusting pinions 13 and 14 serve to adjust the rear portion of the seat in the vertical direction, and adjusting pinions 12 and 15 serve to adjustably move the seat in the direction of vehicle travel F. It is of course possible to use only a single adjusting pinion for each seat adjustment if the entire adjusting mechanism of the seat 22 (FIG. 3) is designed accordingly. However, it is preferred that two adjusting pinions be used for each desired type of adjustable movement.

In FIG. 1, each of the adjusting pinions 11 to 16 is driven by one of two types of adjusting gear assemblies 5 and 6 which can be constructed identically to one another. A drive unit 2 consisting of an electric motor 20 and a gear assembly 21 drives the adjusting gear assemblies 5 having pinions 11, 16 through flexible transmission elements 19. Another drive unit 4 drives adjusting gear assemblies 5 having the pinions 13,14 through flexible transmission elements 19, and a third drive unit 3, also consisting of electric motor 20 and gear assembly 21, transmits torque to the remaining two adjusting gear assemblies 6 having pinions 12,15 through rigid transmission elements 18. Use of rigid transmission elements such as the elements 18 will be dependent upon the particular space available and mounting conditions.

Figure 2:
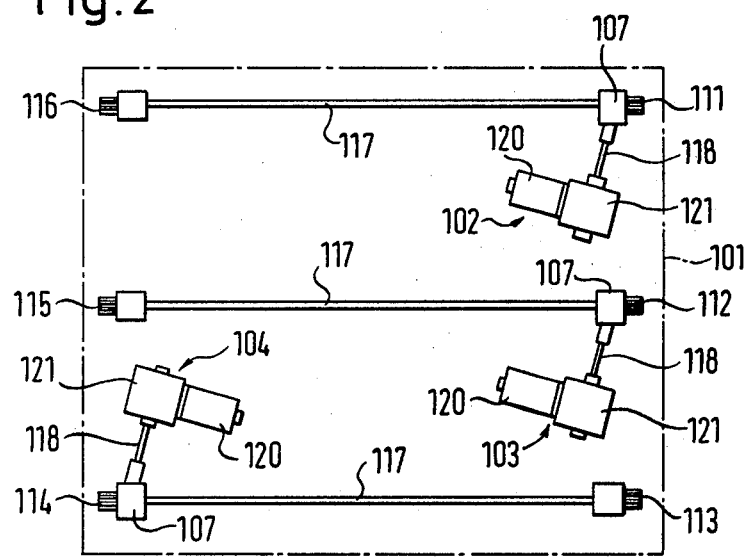
FIG. 2 is a schematic diagram similar to FIG. 1 showing three drive units each associated with a single adjusting gear assembly.

FIG. 2 shows a modification of the seat adjusting arrangement of FIG. 1 wherein similar parts are denoted by the same reference numerals increased by the number 100. Here, drive units 102,103 and 104 each drive an adjusting gear assembly 107 arranged at a side of the seat region 101. Each adjusting gear assembly 107 directly drives a corresponding, immediately adjacent adjusting pinion 111,112 or 114 and drives one of oppositely arranged adjusting pinions 113,115 or 116 through rigid transmission elements 117. An input shaft coupling 118 of each of the adjusting gear assemblies 107 is arranged obliquely to the axis of rotation of the adjusting pinion, rather than at right angles thereto. Such an arrangement often allows the drive units 102,103 and 104 to be more easily accommodated in a given space. It is noted that the gear assemblies 121 of each drive unit 102,103 and 104 can be in the form of a worm gear unit so that different desired adjustment speeds can be obtained merely by changing the pitch of the worm and the worm gear of the gear assemblies 121. All other components of the drive units can be of identical construction relative to one another.

Figure 3:
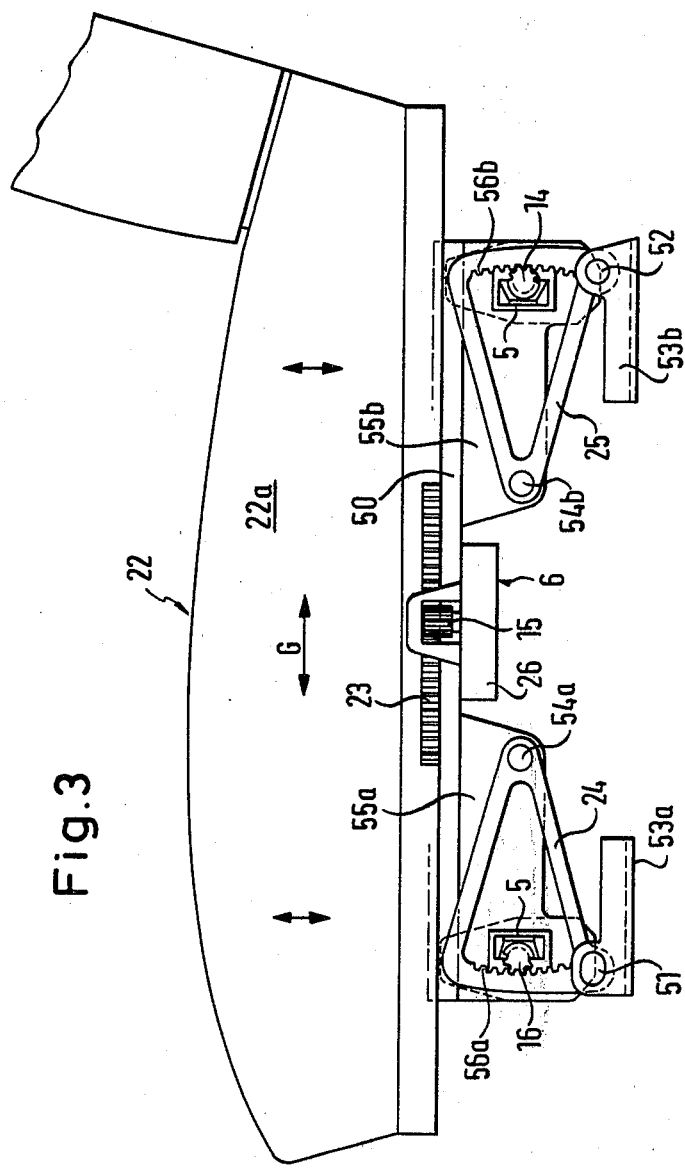
FIG. 3 is an elevational view of an arrangement for imparting movement to an object according to the present invention.

FIG. 3 is an elevational view of the arrangement for adjustably moving a seat 22 according to the present invention. Adjusting gear assembly 6 with its associated pinion 15 provides adjustable horizontal movement of the seat. Gear assembly 6 together with its gear housing 26 is fastened to a seat frame 50. On the seat frame 50, the seat pad 22a of the vehicle seat 22 is guided for movement in the direction of double-headed arrow G. A rack 23 is arranged on seat pad 22a, rack 23 engaging the adjusting pinion 15. On either side of median plane E (FIG. 1), seat frame 50 is supported by two generally triangular shaped support members 24,25 which are supported on base parts 53a, 53b of a base frame through joints 51,52 for pivotal movement about axes perpendicular to the median plane E. The triangular shaped support members 24,25 are joined at 54a,54b to brackets 55a,55b, which are fixed to the seat frame 50 for pivotal movement about axes perpendicular to the plane E. The gear housings of adjusting gear assembly 5 are fastened to the brackets 55a,55b so that the axes of the adjusting pinions 14,16 are also perpendicular to the plane E. The triangular shaped support members 24,25 have sets of teeth 56a,56b which teeth extend along the inner edges of their arms in a generally vertical direction, as shown in FIG. 3. Adjusting pinions 14,16 are in meshed engagement with the sets of teeth 56a,56b. Accordingly, adjusting gear assemblies 5 will move vertically relative to the sets of teeth 56a,56b as the adjusting pinions 14,16 rotate, thereby adjustably moving the forward and rearward portions of the seat frame 50 as the triangular shaped support members 24,25 pivot about the joints 54a and 54b. Joint 51 between the triangular shaped support member 24 and the base part 53a is arranged to allow a slight degree of movement in the direction of arrow G to enable the forward and rearward portions of the seat frame to be separately raised and lowered as desired.

FIGS. 4-7 show an adjusting gear assembly 5 which can be used with the arrangement of FIG. 1. In FIG. 4, gear housing 26 supports a single-thread worm 30 and a worm gear 31 for rotation therein. A worm gear shaft 58 supports adjusting pinion 11 along with axially spaced worm gear 31. Worm gear shaft 58 is supported, at one end, in a first bearing 8 formed in the housing 26, and at the other end in a second bearing 9 formed in a gear housing cover 28. Both bearings 8,9 preferably include a plastics material bushing. Further, it can be seen that the worm 30 is supported within a recess 32 in the gear housing 26 by a bearing insert 37. Parts within the gear housing 26 are held in place by means of the cover 28 which is wedged or screwed into the housing 26 at 59.

FIG. 5 is a view of the adjusting gear assembly 5 of FIG. 4, with the cover 28 removed. The housing 28 is elongated and forms an open space which extends through the exterior thereof in the direction out of the drawing. The single-thread worm 30 and the worm gear 31 are arranged within this opening of the gear housing 26. Worm shaft 62 is supported by two bearing inserts 37,38 which are fitted into corresponding recesses 32,33 in the gear housing 26. A collar 39 extends from the gear housing 26 in axial alignment with the worm shaft 62 for connecting with a protective guide sleeve 40. Guide sleeve 40 covers flexible shaft 19 which rotatably drives the worm. The axis of rotation of the worm shaft 62 is inclined obliquely relative to the longitudinal axis of symmetry of the gear housing 26 as shown in FIG. 5. As already discussed in connection with the arrangement of FIG. 1, it is therefore possible to arrange the adjusting pinions 12,15 and their common drive unit 3 aligned perpendicularly relative to the plane E, and still allow for the angular positions of the longitudinal axis of symmetry of the gear housing 26 relative to the seat region 1 to be selected as desired.

FIG. 6 shows the placement of bearing insert 37 in the recess 32 of the gear housing 26 for supporting the worm shaft 62. When the gear housing cover 28 (FIG. 4) is in place, the bearing insert 37 is fixed in the housing 26.

FIG. 7 shows the two bearing inserts 37 and 38 arranged in the corresponding recesses 32 and 33 of the gear housing 26, the cover 28 not being shown in FIG. 7. Also, collar 39 which connects with the protective guide sleeve 40 of the flexible shaft 19 is integrally formed with the gear housing 26.

Referring again to FIG. 4, it will also be seen that the adjusting pinion 11 is accessible within opening 61 in the gear housing 26, thereby allowing the adjusting pinion 11 to be brought into meshed engagement with rack 23 as shown in FIG. 3.

Figure 8:
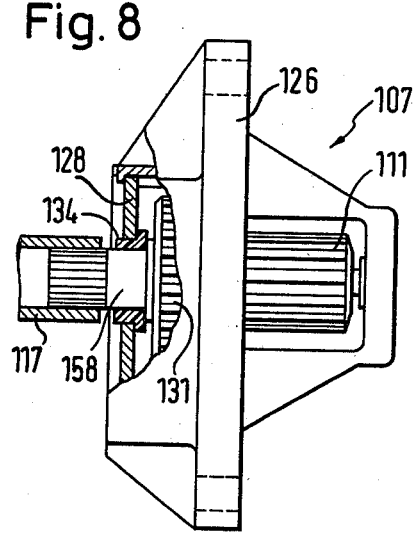
FIG. 8 is a partial sectional view, similar to FIG. 4, of a modification of the adjusting gear assembly of FIGS. 4-7.

FIG. 8 shows an adjusting gear assembly 107 which substantially corresponds to the adjusting gear assembly 5 of FIG. 4. Similar parts are provided with the same reference numerals as in FIG. 4, each increased by the number 100. In the embodiment of FIG. 8, worm gear shaft 158 of worm gear 131 extends axially from the side of worm gear 131 which is located further from the adjusting pinion 111 wherein the shaft 158 is guided through cover 128 in a bearing 134. On the outside of the cover 128, the worm gear shaft 158 is coaxially fixed to a tube section 117 such as shown in FIG. 2. Also, with the embodiment of FIG. 8, the housing 126 can be the same as the housing 26 of the embodiment of FIGS. 4-7 with only the cover 128, the bearing 134 and the worm gear shaft 158 being changed. Thus, the adjusting gear assemblies 107 shown in FIG. 2 can all be of the same construction shown in FIG. 8.

Figure 9:
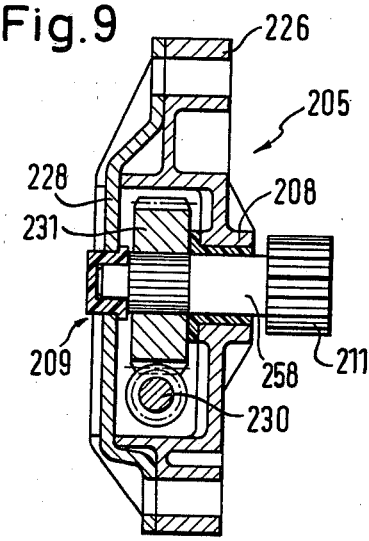
FIG. 9 is a partly sectional view, similar to FIG. 4, of another modification of the adjusting gear assembly.

FIG. 9 is a sectional view taken through another embodiment of an adjusting gear assembly 205 according to the present invention. In FIG. 9, parts similar to those of the adjusting gear assembly of FIG. 4 are provided with the same reference numerals each increased by the number 200. Gear housing 226 and worm gear shaft 258 differ in their construction from the embodiment of FIG. 4 in that the first bearing 208 is arranged between adjusting pinion 211 and worm gear 231. The second bearing 209 is, as before, arranged in the cover 228 of the gear housing 226. Also, as already described, the worm 230 is supported by bearing inserts (not shown) in corresponding recesses of the housing 226 which inserts are held in place by the cover 228. In the embodiment of FIG. 9, the cover 228 is fastened against the housing 226 by means of screws (not shown).

Figure 10:
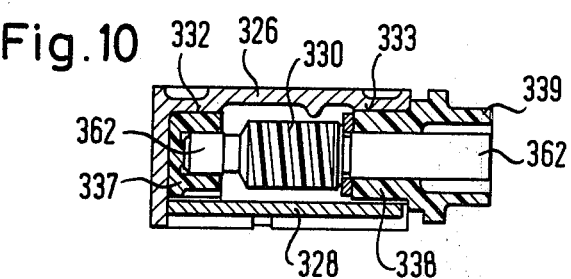
FIG. 10 is a sectional view of a worm bearing arrangement, similar to FIG. 7, as taken through line X—X of FIG. 6 showing a first angular position of the worm relative to the gear housing.
Figure 11:
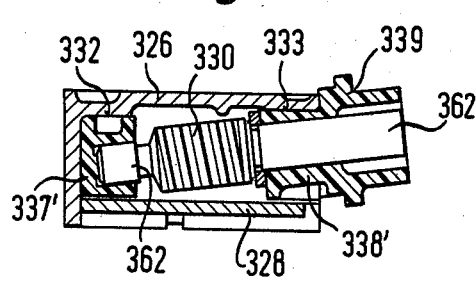
FIG. 11 is a sectional view, similar to FIG. 10, showing a second angular position of the worm relative to the gear housing.
Figure 12:
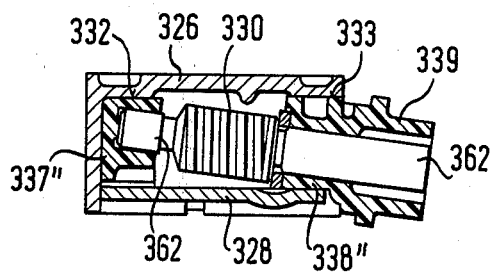
FIG. 12 is a sectional view, similar to FIG. 10, showing a third angular position of the worm relative to the gear housing.

FIGS. 10-12 show a further modification of the bearing arrangement for worm shaft 362. Parts which are similar to those of the embodiment of FIG. 4 have the same reference numerals each increased by the number 300. The worm shaft bearing arrangement in FIG. 10 differs from that of FIG. 7 in that collar 339 is integrally formed with bearing insert 338, and cover 328 is shown inserted in the housing 326. FIGS. 11 and 12 show further variations of the worm shaft bearing arrangement. Modified bearing inserts 337′, 338′ and 337″, 338″ are shown, these inserts having bearing bores for the worm shaft whose axes are inclined relative to the axis of the worm shaft as shown in FIG. 10. It is therefore possible to maintain the same overall shape for the gear housing 326 which is usually the most expensive component of the adjusting gear assembly, regardless of the inclination selected for the worm shaft 362 relative to the gear housing 326 to accommodate different mounting conditions. The worm shaft 362 is inclined relative to the plane H of the worm gear of FIG. 4 so that the driven end of the shaft 362 extends over either one of both sides of the plane H. Also, collar 339 is formed integrally with the bearing insert 338′ and 338″. As in the embodiments described above, the cover 328 serves to hold bearing inserts 337, 337′ or 337″, and 338, 338′ or 338″ within the gear housing 326. In the event one type of worm gear having straight teeth is used, it is possible to use the same worm gear for the three worm shaft support arrangements of FIGS. 10, 11 and 12 by simply modifying the worm 330 accordingly.

By means of the worm shaft arrangements according to FIGS. 11 and 12, the inclined configurations between the transmission members 118 and the gear assemblies 107 as illustrated in FIG. 2 can be obtained.

Each gear arrangement described above is highly flexible in its ability to accommodate various mounting conditions. Costs involved in adjusting the components to meet these conditions are reduced to a minimum, due in part to the fact that the housings of the individual adjusting gear assemblies can be constructed substantially identically to one another. The components or parts which need to be modified to meet the various mounting conditions (the bearing inserts) are themselves either made of an inexpensive material, or are formed by chip cutting (the worm gear) or rolling (the worm). By arranging the bearing 134 in the cover 128, it is possible to provide within the space available, an adjusting gear assembly including an adjusting pinion on one side of a vehicle seat, and an adjusting pinion alone on the other side of the seat. The adjusting gear assembly, in such case, differs from those having only a single adjusting pinion associated therewith in that it only requires a different cover, and a different worm gear shaft with possibly a different plastics material bearing insert.

The reference herein to gear housings of substantially identical construction for the various adjusting gear assemblies disclosed is intended especially to include the use of a single casting pattern for all of the gear housings, although chip cutting work to be later performed on the pattern may differ among the various gear housings. As can be seen in FIG. 5, the gear housing 26 can be constructed, for example, with oblong mounting holes 64 so that each of the gear housings can be arranged in various positions relative to nearby objects. It is also possible to provide a number of threaded bores in the gear housing 26 so that the same gear housing can be mounted in various configurations.

It will also be understood that reference herein to an object to be moved by the arrangement of the present invention includes objects having several movable parts, for example, a motor vehicle seat including a seat pad 22a and a backrest, wherein the backrest can also be adjustable relative to the seat pad 22a.

While specific embodiments of the invention have been shown and described in detail to illustrate the application of the inventive principles, it will be understood that the invention may be embodied otherwise without departing from such principles.

What is claimed is:

1. An arrangement for imparting different adjustable directional movements to an object, comprising a number of adjusting gear assemblies each corresponding to one of said different adjustable directional movements and including a gear housing, a worm gear having an axis and supported in said gear housing for rotation about the axis of said worm gear, motion transmitting means for connecting said worm gear to the object to adjustably move the object when said worm gear is driven by said worm, a worm arranged for rotation in said gear housing in meshed engagement with said worm gear for driving said worm gear, drive means including a worm shaft for driving said worm, a number of worm shaft bearing inserts removably mounted in said gear housing for supporting said worm shaft, seating means including recesses formed in said gear housing for seating said worm shaft bearing inserts wherein each of said recesses is arranged to seat a selected one of a number of differently shaped worm shaft bearing inserts so that said worm shaft can be supported at a desired position relative to said gear housing in accordance with the selected bearing inserts seated in said recesses, at least some of the gear housings of said adjusting gear assemblies being constructed substantially identically to one another.

2. An arrangement according to claim 1, wherein said worm gears of said adjusting gear assemblies are constructed substantially identically.

3. An arrangement according to claim 1, wherein said worms of said adjusting gear assemblies are constructed substantially identically.

4. An arrangement according to claim 1, wherein two of said adjusting gear assemblies are provided for each one of said directional movements, and said drive means includes a common drive device for driving each said worm of said two adjusting gear assemblies.

5. An arrangement according to claim 1, wherein said drive means includes separate drive devices connected to said adjusting gear assemblies, each said separate drive device corresponding to one of said different adjustable directional movements.

6. An arrangement according to claim 1, wherein said drive means includes a flexible shaft.

7. An arrangement according to claim 1, wherein said drive means includes a rigid shaft.

8. An arrangement according to claim 1, wherein said motion transmitting means comprises an adjusting pinion coaxially fixed to an associated one of said worm gears.

9. An arrangement according to claim 8, comprising at least two of said adjusting pinions coaxially fixed to said associated worm gear for imparting a given one of said different adjustable movements to the object.

10. An arrangement according to claim 1, including a worm gear shaft coaxially fixed to said worm gear and extending from both sides of said worm gear, a gear housing cover, and means for supporting said worm gear shaft including a first bearing in said gear housing and a second bearing in said cover.

11. An arrangement according to claim 10, wherein said cover threadably engages said gear housing.

12. An arrangement according to claim 10, wherein said cover is wedged into said gear housing.

13. An arrangement according to claim 10, wherein said motion transmitting means includes an adjusting pinion arranged on said worm gear shaft within said gear housing intermediate said first bearing and said worm gear, said gear housing having an opening in the region of said adjusting pinion to allow said adjusting pinion to be coupled to the object to be moved.

14. An arrangement according to claim 10, wherein said motion transmitting means includes an adjusting pinion arranged on said worm gear shaft outside of said gear housing on the side of said first bearing which faces away from said worm gear.

15. An arrangement according to claim 14, wherein said worm gear shaft extends through said cover and said motion transmitting means includes an adjusting pinion connected to said worm gear shaft on the side of said cover which faces away from said gear housing.

16. An arrangement according to claim 15, including a rigid shaft for coupling said adjusting pinion to said worm gear shaft.

17. An arrangement according to claim 1, wherein said seating means in said gear housing forms two recesses, and including a cover for closing said housing, said two recesses being open in the direction toward said cover to receive said worm shaft bearing inserts so that said cover serves to close said recesses, and said worm shaft is supported in said recesses by said worm shaft bearing inserts and said worm shaft bearing inserts are held in said recesses by said cover.

18. An arrangement according to claim 1, wherein said drive means comprises a flexible shaft including a protective guide sleeve coaxially arranged about said flexible shaft, one of said bearing inserts having a part for connecting to said protective guide sleeve.

19. An arrangement according to claim 1, wherein said worm shaft bearing inserts differ in shape from one another so that the axis of said worm shaft can be arranged to extend in different selected angular positions within and with respect to a plane which extends perpendicular to the axis of said worm gear.

20. An arrangement according to claim 19, wherein the shape of said worm and the teeth of said worm gear are selected in accordance with said angular position of the axis of said worm shaft.

21. An arrangement according to claim 1, wherein the object to be adjustably moved is a motor vehicle seat mounted in a vehicle which moves in a travel direction, said motion transmitting means including a forward adjusting pinion on each side of said seat in a direction transverse of said travel direction for adjustably vertically moving the forward portion of the seat, a rearward adjusting pinion on each side of said seat in a direction transverse of said travel direction for adjustably vertically moving the rearward portion of the seat, and a central adjusting pinion intermediate the forward and rearward adjusting pinions on each side of the seat for adjustably horizontally moving the seat in the travel direction of the vehicle.

22. An arrangement according to claim 1, including fastening means for said gear housing for mounting said gear housing in one of a number of positions relative to the object to be moved.

23. An arrangement according to claim 1, wherein said drive means comprises at least one drive device including an electric motor and a gear unit directly mounted to and driven by said electric motor.

24. An arrangement according to claim 23, wherein said gear unit has a plurality of outputs for connecting said gear unit with said drive means.

25. An arrangement according to claim 1, wherein each of said adjusting gear assemblies includes means to prevent motion from being transferred from said worm gear to an associated one of said worms.

26. An arrangement according to claim 1, wherein each said worm of said adjusting gear assemblies is formed as a single thread.

27. An arrangement according to claim 10, wherein said covers of said adjusting gear assemblies are constructed substantially identically to one another.

28. An arrangement according to claim 18, wherein said bearing inserts comprise a plastics material.

29. An arrangement according to claim 23, including a plurality of said drive devices, each of said gear units having a gear unit housing, said gear unit housings being constructed substantially identically to one another.

* * * * *